United States Patent Office

2,972,605
Patented Feb. 21, 1961

2,972,605

HYDROPEROXIDES OF HIGH POLYMERS AND PROCESSES FOR PRODUCING THE SAME

Giulio Natta, Enrico Beati, and Febo Severini, Milan, Italy, assignors to Montecatini, Società generale per l'Industria Mineraria e Chimica, Milan, Italy No Drawing. Filed July 30, 1956, Ser. No. 600,718

Claims priority, application Italy Aug. 6, 1955

15 Claims. (Cl. 260—88.2)

This invention relates to hydroperoxides of synthetic high polymers and to processes for the production thereof.

It is known that hydrocarbons containing a tertiary carbon atom in the molecule can be converted to the hydroperoxides thereof by the action thereon of molecular oxygen or mixtures of oxygen-containing gases, at suitable temperatures, under the influence of ultraviolet light or in the presence of catalysts.

The reaction does not proceed satisfactorily with all substances containing tertiary carbon atoms. Particular difficulties are encountered when it is attempted to convert polymers of very high molecular weight, the monomeric units of which contain a tertiary carbon atom, such as polystyrene, polypropylene, polybutene, etc., to the corresponding hydroperoxides.

The results heretofore obtained in the hydroperoxidation of polymers of the type aforesaid have not been satisfactory. Various expedients have been proposed for overcoming the difficulties encountered in the direct hydroperoxidation of the polymers. For example, in the case of polystyrene, it has been suggested to carry out the hydroperoxidation on a polystyrene alkylated with propylene instead of on polystyrene per se, by dissolving the alkylated polystyrene in an aromatic solvent and adding varying amounts of peroxides to the solution. However, when the hydroperoxidation is carried out in the proposed manner, the reaction proceeds slowly with appreciable degradation of the alkylated polystyrene during the course thereof.

The primary object of the present invention is to provide an improved process for the hydroperoxidation of high molecular weight polymers the monomeric units of which contain a tertiary carbon atom.

Another object is to provide, as new products, hydroperoxides of linear, head-to-tail high polymers of alpha-olefines.

These and other objects are accomplished by the present invention based on our discovery of the catalytic action exerted by methanol on the hydroperoxidation of the polymers.

In accordance with the invention, therefore, the hydroperoxidation of the polymers is effected in the presence of methanol.

To insure a homogeneous reaction, it is convenient to subject the polymer to the hydroperoxidation in a solvent, such as certain aromatic hydrocarbons, in which the polymer is at least partially solvated (dissolved or swollen), to which solvent contents there is added the catalytic quantity of methanol.

The present process represents an improvement over known hydroperoxidation processes and has the advantage that, by the use thereof, it is possible to rapidly introduce hydroperoxide groups into those polymers containing tertiary carbon atoms only in the main chain, while practically avoiding side reactions. The present method also permits carrying out of the reaction at lower temperatures and fixing on the polymer, in a relatively short time, practically all of the oxygen it is desired to introduce into the polymer, in the form of hydroperoxide groups. An amount of oxygen up to a maximum of a few units percent can be introduced into the polymer, which is more than sufficient for achieving the purposes of the hydroperoxidation.

Moreover, the comparatively high oxygen contents are attained while avoiding, or with maximum reduction of, the degradation and cleavage phenomena that usually accompany take-up of oxygen by these polymers.

Any suitable solvent for the high polymer which is miscible with the methanol used as catalyst may be employed. Such solvents are, for example, aromatic hydrocarbons such as benzene, toluene, etc.

We have observed however, that hydroperoxidation of the polymer proceeds much more rapidly when a solvent is used which is capable of being itself peroxidized, as for instance, cumene, p-cymene and similar hydrocarbons. Cumene is a preferred solvent for the present purposes.

The amount of methanol present in the solvent as catalyst for the reaction may be 1 to 4%, which is smaller than the amount that would effect precipitation of the polymer from solution in the aromatic solvent.

When the hydroperoxidation is effected in the presence of methanol it is unnecessary to add preformed peroxides to the solution. The hydroperoxidation agent may be molecular oxygen, air, and other gaseous mixture containing molecular oxygen.

The reaction can be carried out, for example in a stainless steel stirred autoclave at temperatures between 50° C. and 120° C., using solutions (preferably cumene solutions) of the polymers containing the polymer in a concentration of 10% to 40%, depending on the polymer, and containing from 2 to 4% by weight of methanol based on the total weight of the solution. As an example, a content of hydroperoxide oxygen between 1% and 4% is obtained in from 1 to 14 hours, depending on the polymer used and the operating temperature between 60° C. and 80° C.

It was known that methanol catalyzes the hydroperoxidation of monomeric hydrocarbons containing tertiary carbon atoms, such as cumene, and that the catalytic action of the methanol on such reaction is marked at temperatures of at least 85° C.

However, it was not known heretofore that methanol could exert a catalytic effect at low temperature and on macromolecules, which are very difficult to peroxidize. Moreover, it was not known that the peroxidation of high polymers could be facilitated by the presence of catalysts other than peroxides and, therefore, it could not be anticipated that methanol would exert any positive catalytic action on that reaction. Furthermore, from the known insolubility of the polymeric hydrocarbons of high molecular weight in methanol, it could not be expected that methanol could be used as catalyst for the hydroperoxidation of the polymers.

The polymers that can be peroxidized by the present process include polystyrene and aliphatic poly-alpha-olefines. Such polymers having a molecular weight above 1000 can be converted to the corresponding hydroperoxides by this method.

The polymers treated may be prepared by any of the known polymerization methods. However, the styrene polymers that have given the best results are the crystalline (isotactic) and amorphous (non-isotactic) linear, head-to-tail polystyrenes obtained with the aid of polymerization catalysts prepared from compounds of a transition metal of the 4th to 6th groups of the periodic table and metallo-organic compounds containing a metal from the 2nd or 3rd groups of the periodic table, as disclosed in the pending applications of G. Natta et al., Serial No. 514,097, 514,098 and 514,099, all filed June 8, 1955.

Non-isotactic, amorphous polymers are soluble in various solvents which can be used in carrying out the hydroperoxidation. Isotactic, that is crystalline polymers, can be peroxidized but in order to insure a homogeneous reaction, the peroxidation is carried out in more dilute solutions (e.g. 1% to 10% concentration).

Amorphous or block polymers can be treated in more concentrated solutions. This is the case also for isotactic polymers having a lower melting point, such as polypentene, polyhexene, etc.

Mixtures of amorphous and crystalline polymers may also be peroxidized.

The polymers which can be hydroperoxidized by the present method include, in addition to styrene, other polymeric alpha-olefines such as polypropylene, polybutene, polypentene, and so on. The alpha-olefines may be represented by the general formula

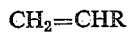

$$CH_2=CHR$$

in which R is an alkyl radical containing from 1 to 16 carbon atoms, an aryl radical containing from 6 to 10 carbon atoms, or an aralkyl radical containing from 7 to 12 carbon atoms.

Such polymers may be of the linear, head-to-tail type obtained by the method of the Natta et al. applications supra, i.e., by effecting the polymerization with the aid of a catalyst prepared by reacting the compound of a transition metal of the 4th to 6th groups of the periodic table, for example titanium tetrachloride or titanium trichloride, with an organic compound of the metal of the 2nd or 3rd group, for instance a metal-alkyl such as triethyl aluminum. The polymerization of the alpha-olefine with the aid of such catalysts may be carried out in an inert paraffinic hydrocarbon solvent or anhydrous benzene at temperatures between 50° C. and 100° C., or at higher temperatures. The polymerizate usually comprises mixtures of amorphous (non-isotactic) and crystallizable (isotactic) linear, head-to-tail polymers. The mixed polymers may be hydroperoxidized directly or the component amorphous and crystalline polymers may be separated and separately hydroperoxidized.

The hydroperoxidation process of the present invention imparts to the alpha-olefine polymers novel useful properties, such as an increase of their affinity toward water and hydroxyl groups containing compounds in general; the tendency of the polymers towards the accumulation of static charges is lowered, while their adhesivity to inorganic materials, such as glass, ceramics and metals is increased; also the adhesion of substances like inks and organic coatings to the surface of the polymers is improved.

The properties thus acquired by the olefine polymers make them suitable for different applications; they may for instance be used as intermediate layers in the coating of surfaces of various types with hydrocarbon polymers in general.

The following examples are illustrative of specific embodiments of the invention, it being understood that these examples are not given as limitative.

In the examples, the symbol "Nl" means "normal liters" or "liters under standard conditions."

*Example 1*

28 g. of an amorphous, linear head-to-tail styrene polymer (prepared by the method described in the Natta et al. application supra, having an intrinsic viscosity of 0.092 determined in benzene at 30° C., corresponding to a molecular weight of about 10,000) are dissolved in 43 g. cumene, in the absence of methanol. The solution is introduced into a stainless steel shaking autoclave of 490 cc. capacity. The solution is heated to 70° C. and air is pumped into the autoclave up to 25 atmospheres. Oxygen uptake is allowed to proceed until the pressure has dropped to 24 atmospheres. Agitation of the autoclave is continued for a total of 7 hours, then the reaction product is discharged. The polymer is precipitated from the solution with methanol and separated from the solvent. Its oxygen content corresponds to one hydroperoxide group in 18 monomeric units. The solution, separated from the polymer, contains all the cumene, which has been partially hydroperoxidized. An analysis shows that the cumene has fixed by hydroperoxidation 0.25 Nl oxygen. The polymer has fixed in the form of hydroperoxide groups 0.33 Nl oxygen. The intrinsic viscosity of the hydroperoxidized product in benzene at 30° C. is 0.084 (corresponding to a molecular weight of about 8,000).

The intrinsic viscosity as indicated in this example and in the following examples was determined in the solvent and at the temperature indicated, and is expressed in cc. per 1 g. of solvent.

*Example 2*

The process is carried out as in Example 1, except that 1.9 g. methanol is added to the cumene solution of polystyrene. The mixture is heated to 70° C. and air is introduced into the autoclave up to 25 atmospheres. Oxygen uptake is allowed to proceed until the pressure has dropped to 22 atmospheres. Agitation of the autoclave is continued for 8 hours, then the reaction product is withdrawn. The polymer is precipitated from the solution by a further addition of methanol, and separated from the solvent. Its oxygen content corresponds to one hydroperoxide group in 9 monomeric units. The cumene has also been partially hydroperoxidized. An analysis shows that the cumene has fixed by hydroperoxidation 0.4 Nl oxygen whereas the polymer has fixed in the form of hydroperoxide groups 0.67 Nl oxygen. The hydroperoxidized polymer has an intrinsic viscosity, in benzene at 30° C., of 0.082 (corresponding to a molecular weight of about 8,000).

*Example 3*

The reaction is carried out as in the foregoing example. The mixture is heated to 70° C. and air is introduced into the autoclave up to a pressure of 25 atmospheres. Oxygen uptake is allowed to proceed until the pressure has dropped to 21 atmospheres, then the pressure is brought again to the initial value by means of oxygen, and the absorption is allowed to proceed until the pressure is down to 22.5 atmospheres. Agitation of the autoclave is continued for a total of 12 hours. The polymer obtained has an oxygen content corresponding to one hydroperoxide group in 7.8 monomeric units. The cumene has been also partially hydroperoxidized. An analysis shows that it has fixed by hydroperoxidation 0.60 Nl oxygen, whereas the polymer has fixed in the form of hydroperoxide groups 0.77 Nl oxygen. The hydroperoxidized polymer has an intrinsic viscosity, in benzene at 30° C., of 0.079 (corresponding to a molecular weight of about 7,500).

*Example 4*

10 g. of an amorphous, linear, head-to-tail polypropylene having an intrinsic viscosity in tetralin at 135° C. of 0.48 (corresponding to a molecular weight of about 11,000), dissolved in 86 g. cumene, are introduced into the autoclave of Example 1 and 3.9 g. methanol are added. The solution is heated to 70° C. and air is introduced into the autoclave up to 24 atmospheres. Oxygen uptake is allowed to proceed until the pressure has dropped to 20 atmospheres. The pressure is raised to the initial value by means of oxygen and the oxygen uptake is allowed to proceed until the pressure is down to 23.4 atmospheres. The autoclave is kept in agitation for a total of 7 hours. After precipitation from the solution by further addition of methanol, and removal of the solvents, the polymer has a content in hydroperoxidic oxygen corresponding to one group in 47 monomeric units. The cumene present has also been partially hydroperoxidized. An analysis shows that it has fixed by hydroperoxidation 1.24 Nl oxygen whereas the polymer has fixed in the form of hydroperoxide groups 0.114 Nl oxygen.

Example 5

The reaction is carried out as in the foregoing examples, introducing into the autoclave 8 g. of a polybutylene having an intrinsic viscosity, in tetralin at 135° C., of 0.32 (corresponding to a molecular weight of about 5,800), dissolved in 69 g. cumene and 1.7 g. methanol. The solution is heated to 70° C. and air is introduced into the autoclave up to 25 atmospheres. Oxygen uptake is allowed to proceed until the pressure has dropped to 21 atmospheres. Agitation of the autoclave is continued for 8 hours, then the reaction product is discharged and the polymer is precipitated from the solution by further addition of methanol and separated from the solvent. It has an oxygen content corresponding to one hydroperoxide group in 46 monomeric units. The cumene has also been partially hydroperoxidized. An analysis shows that it has fixed by peroxidation 1.12 Nl oxygen, whereas the polymer has fixed in the form of hydroperoxide groups 0.0696 Nl oxygen.

Example 6

The process is carried out as in Example 2, but using a solution of 10 g. linear, head-to-tail polystyrene having an intrinsic viscosity in benzene at 30° C. of 1.025 (corresponding to a molecular weight of about 280,000), in 44 g. cumene, with the addition of 2 g. methanol.

The autoclave is heated to 70° C. and air is pumped in up to 21 atm. pressure. Oxygen uptake is allowed to proceed until the pressure has dropped to 19 atm. Agitation of the autoclave is continued for 27 hours. The product is discharged, and the polymer precipitated and separated from the solvent. Its oxygen content corresponds to one hydroperoxide group on 30 monomeric units. The cumene has also been partially peroxidized. An analysis shows that it has fixed 0.56 Nl oxygen, while the polymer has fixed, in the form of hydroperoxide groups, 0.07 Nl. The intrinsic viscosity of the hydroperoxidized polystyrene, determined in benzene at 30° C., is 0.575 (corresponding to a molecular weight of about 121,000).

Example 7

2 g. of the n-heptane soluble fraction of a polymer of 4-methyl-1-pentene, obtained with the aid of a polymerization catalyst prepared from a titanium chloride and triethyl aluminium, are dissolved in 43 g. cumene containing 1.5 g. methanol, and introduced in the autoclave of Example 1. The 4-methyl-pentene-1 polymer is a crystalline, isotactic polymer and has an intrinsic viscosity, measured in tetralin at 135° C., of 0.62. The autoclave is heated to 80° C. and air is admitted up to 23 atm. pressure. The oxygen uptake is allowed to proceed until the pressure has dropped to 20.2 atm. and agitation of the autoclave is continued for a total of 14 hours.

The product obtained has an oxygen content corresponding to one hydroperoxide group in 49 numeric units. The cumene has fixed 0.78 Nl oxygen, while the polymer has fixed 0.011 Nl.

Example 8

12 g. of a linear, head-to-tail crystalline isotactic 1-butene polymer, having an intrinsic viscosity, in tetralin at 135° C. of 2.98 (corresponding to a molecular weight of about 170,000), dissolved in 260 g. cumene containing 10 g. methanol, are introduced into a shaking stainless steel autoclave of 2000 cc. capacity.

The autoclave is heated to 75° C. and air is pumped in up to 22 atm. pressure. The oxygen uptake is allowed to proceed until the pressure has dropped to 20 atm., the autoclave being kept in motion for a total of 9 hours. The reaction product has an oxygen content corresponding to one hydroperoxide group in 178 monomeric units. The cumene has fixed, in the form of hydroperoxide groups, 2.5 Nl oxygen, while the polymer has fixed 0.027 Nl.

Example 9

A raw polymerization product of butene-1 is used, having an intrinsic viscosity, in tetralin at 135° C., of 2.03 (corresponding to a molecular weight of about 95,000). The polymer consists of 27% amorphous non-crystallizable polybutene, soluble in ether, and 71% of isotactic, crystalline polybutene, soluble in heptane. The rest consists of low, acetone soluble polymers and ashes.

19 g. of the polymer, dissolved in 216 g. cumene containing 8.5 methanol, are introduced in a 2000 cc. stainless steel shaking autoclave. The autoclave is heated to 75° C. and air is pumped in up to a pressure of 23 atm. Oxygen uptake is allowed to proceed until the pressure has dropped to 20.7 atm., the autoclave being kept in motion for a total of 10 hours.

The obtained product has an oxygen content corresponding to one hydroperoxide group in 172 monomeric units. The cumene has fixed 2.3 Nl oxygen, while the polymer has fixed 0.045 Nl.

Example 10

10 g. of a high molecular weight, linear, head-to-tail copolymer of ethylene and propylene containing 45% of ethylene, having an intrinsic viscosity, in tetralin at 135° C., of 3.31 (corresponding to a molecular weight of about 200,000), dissolved in 164 g. cumene, containing 4.7 g. methanol, are introduced in the autoclave of Example 1.

The autoclave is brought to 75° C. and air is admitted up to a pressure of 22.5 atm.

The oxygen uptake is allowed to proceed until the pressure has dropped to 18 atm. The autoclave is kept in motion 5 hours longer and the product is then discharged. After precipitation and separation from the solvent, a product is obtained which contains 0.7 g. oxygen per 100 g.

The polymer has fixed, in the form of hydroperoxide groups 0.049 Nl oxygen, the solvent is 1.2 Nl.

Example 11

12 g. of an amorphous, non crystallizable polypropylene having an intrinsic viscosity, in tetralin at 135° C., of 0.923 (molecular weight about 28,000), are dissolved in 86 g. p-cymene, containing 3 g. methanol, and peroxidized at 80° C. in the autoclave of Example 1. The initial air pressure is 24 atm. and the oxygen uptake is allowed to proceed until the pressure has dropped to 21.5 atm. The autoclave is kept in motion for a total of 12 hours.

The product obtained has an oxygen content corresponding to one hydroperoxide group in 380 monomeric units. While the polymer has adsorbed 0.0170 Nl oxygen, the solvent has fixed 0.58 Nl.

The peroxidized polymers, after separation from the solvent in which the peroxidation is effected, and from soluble peroxides, can be used in the preparation of grafted polymers by the known method. For instance, by reacting such peroxidized polymers with monomers capable of being polymerized by the action of free radicals, such as methyl methacrylate, vinyl acetate, etc., it is possible to graft on the hydrocarbon macromolecules a large number of side chains consisting of polymers of said monomers.

It is also possible to reduce the hydroperoxide groups to alcoholic groups by means of suitable reagents such as ferrous salts, and to then carry out various reactions involving the alcoholic groups, for example introduction of side chains of ethylene oxide, or the introduction of cross-links by reaction with diisocyanates, etc.

Since various changes and modifications may be made in details in practicing the invention without departing from the spirit and scope thereof, it will be understood that it is not intended to limit the invention except as defined in the appended claims.

What is claimed is:

1. A process for preparing hydroperoxides of polymers containing tertiary carbon atoms in the main chain, having a molecular weight above 1000, and selected from the group consisting of substantially linear, regularly head-to-tail homopolymers of alpha-olefins of the formula $$CH_2=CHR$$

wherein R is selected from the group consisting of alkyl radicals and the phenyl group, and substantially linear, regularly head-to-tail copolymers of said alpha-olefins with ethylene, which process comprises passing a hydroperoxidizing agent selected from the group consisting of molecular oxygen and oxygen-containing gases through a solution of from about 10% to about 40% of the polymer in an auto-oxidizable aromatic solvent containing from 2.5% to 5% of methanol, by weight on the auto-oxidizable solvent, under a pressure between 2 and 50 atmospheres, at a temperature between 60° C. and 80° C., and in the absence of a pre-formed peroxide, to obtain a hydroperoxide of said polymer containing from 0.05 to 20 hydroperoxide groups per 100 of the monomer units making up the polymer chain.

2. The process according to claim 1, characterized in that the auto-oxidizable aromatic solvent is cumene.

3. The process according to claim 1, characterized in that the hydroperoxidizing agent is passed through a cumene solution of amorphous, substantially linear, regularly head-to-tail polystyrene.

4. The process according to claim 1, characterized in that the hydroperoxidizing agent is passed through a cumene solution of an amorphous, substantially linear, regularly head-to-tail polypropylene.

5. The process according to claim 1, characterized in that the hydroperoxidizing agent is passed through a cumene solution of a substantially linear, regularly head-to-tail polybutene-1.

6. The process according to claim 1, characterized in that the hydroperoxidizing agent is passed through a cumene solution of a polymer of 4-methyl-1-pentene.

7. The process according to claim 1, characterized in that the hydroperoxidizing agent is passed through a cumene solution of an aliphatic alpha-olefin polymerizate comprising a mixture of amorphous, non-crystallizable, substantially linear regularly head-to-tail macromolecules and crystallizable isotactic macromolecules.

8. The process according to claim 1, characterized in that the hydroperoxidizing agent is passed through a cumene solution of a substantially linear, regularly head-to-tail copolymer of ethylene and propylene.

9. Hydroperoxides of polymers containing tertiary carbon atoms in the main chain, having a molecular weight above 1000, and selected from the group consisting of substantially linear, regularly head-to-tail homopolymers of alpha-olefins $$CH_2=CHR$$

in which R is selected from the group consisting of alkyl radicals and the phenyl radical, and substantially linear, regularly head-to-tail copolymers of the alpha-olefins with ethylene, said hydroperoxides being obtained by the process of claim 1.

10. A hydroperoxide of an amorphous substantially linear regularly head-to-tail polystyrene and obtained by the process of claim 3.

11. A hydroperoxide of an amorphous, substantially linear, regularly head-to-tail polypropylene and obtained by the process of claim 4.

12. A hydroperoxide of a substantially linear, regularly head-to-tail polybutene-1, and obtained by the process of claim 5.

13. A hydroperoxide of poly(4-methyl-1-pentene) and obtained by the process of claim 6.

14. A hydroperoxide of an aliphatic alpha-olefin polymerizate comprising a mixture of amorphous, non-crystallizable, substantially linear, regularly head-to-tail macromolecules and crystallizable isotactic macromolecules, and obtained by the process of claim 7.

15. A hydroperoxide of a substantially linear, head-to-tail copolymer of ethylene and propylene, and obtained by the process of claim 8.

References Cited in the file of this patent

UNITED STATES PATENTS

| 2,122,826 | Van Peski | July 5, 1938 |
| 2,461,966 | Davis | Feb. 15, 1949 |
| 2,762,790 | Greene | Sept. 11, 1956 |
| 2,837,496 | Vandenberg | June 3, 1958 |
| 2,843,633 | Natta et al. | July 15, 1958 |

FOREIGN PATENTS

| 526,101 | Italy | May 14, 1955 |

OTHER REFERENCES

Schmidt et al.: "Principles of High Polymer Theory and Practice," pp. 522–25 (1948), McGraw-Hill.